(12) United States Patent
O'Hare et al.

(10) Patent No.: US 11,498,133 B2
(45) Date of Patent: Nov. 15, 2022

(54) MODULAR WORKHOLDING APPARATUS

(71) Applicant: Hexagon Metrology, inc., North Kingstown, RI (US)

(72) Inventors: Jonathan J. O'Hare, East Greenwich, RI (US); Jonathan Dove, Woodstock, IL (US)

(73) Assignee: Hexagon Metrology, Inc., North Kingstown, RI (US)

( * ) Notice: Subject to any disclaimer, the term of this patent is extended or adjusted under 35 U.S.C. 154(b) by 322 days.

(21) Appl. No.: 16/563,448

(22) Filed: Sep. 6, 2019

(65) Prior Publication Data

US 2020/0078871 A1 Mar. 12, 2020

Related U.S. Application Data

(60) Provisional application No. 62/728,414, filed on Sep. 7, 2018.

(51) Int. Cl.
*B23B 31/28* (2006.01)
*B23Q 3/10* (2006.01)
*B23Q 3/15* (2006.01)

(52) U.S. Cl.
CPC .............. *B23B 31/28* (2013.01); *B23Q 3/103* (2013.01); *B23Q 3/15* (2013.01); *B23B 2270/38* (2013.01)

(58) Field of Classification Search
CPC ............ B23Q 1/42; B23Q 2003/15572; B23Q 2703/12; B23Q 3/02; B23Q 3/06;
(Continued)

(56) References Cited

U.S. PATENT DOCUMENTS 5,137,243 A * 8/1992 Stevens ................. B25B 1/2457
248/912
8,251,358 B2 * 8/2012 Grolman ................. B25B 5/163
269/275
(Continued)

FOREIGN PATENT DOCUMENTS

CN 201297980 Y 8/2009
CN 201565806 U 9/2010
CN 106624897 A 5/2017

OTHER PUBLICATIONS

International Search Report and Written Opinion of the International Searching Authority for Application No. PCT/US2019/050033, dated Jan. 27, 2020, 18 pages.

*Primary Examiner* — Tyrone V Hall, Jr.
(74) *Attorney, Agent, or Firm* — Nutter McClennen & Fish LLP

(57) ABSTRACT

A workholding apparatus for components having complex geometries or surfaces, which components are difficult constrain for the purpose of inspection, addresses the problem of adequately constraining such components in a convenient and cost-effective manner so that they do not move during inspection, while also making all or most critical features accessible to the inspection instruments being used. A method teaches how to eliminate setup changes between different components through the use of inexpensive modular attachments. These attachments are in the form of a single piece thermoplastic part which is affixed to each component having also reference features that can be interlocked into a common base fixture for more efficient inspection operations.

13 Claims, 14 Drawing Sheets

(58) Field of Classification Search
CPC ........ B23Q 3/062; B23Q 3/063; B23Q 3/065; B23Q 3/101–104; B25B 1/24; B25B 1/2405; B25B 1/2452; B25B 1/2457; B25B 1/2463; B25B 1/2468; B25B 11/00; B25B 11/02; B25B 5/14; B25B 5/16; B25B 5/163
See application file for complete search history.

(56) References Cited

U.S. PATENT DOCUMENTS

| | | | |
|---|---|---|---|
| 2010/0018365 A1* | 1/2010 | Tyler | B25B 5/163 81/423 |
| 2014/0197587 A1* | 7/2014 | O'Rell | B23Q 1/42 269/246 |

\* cited by examiner

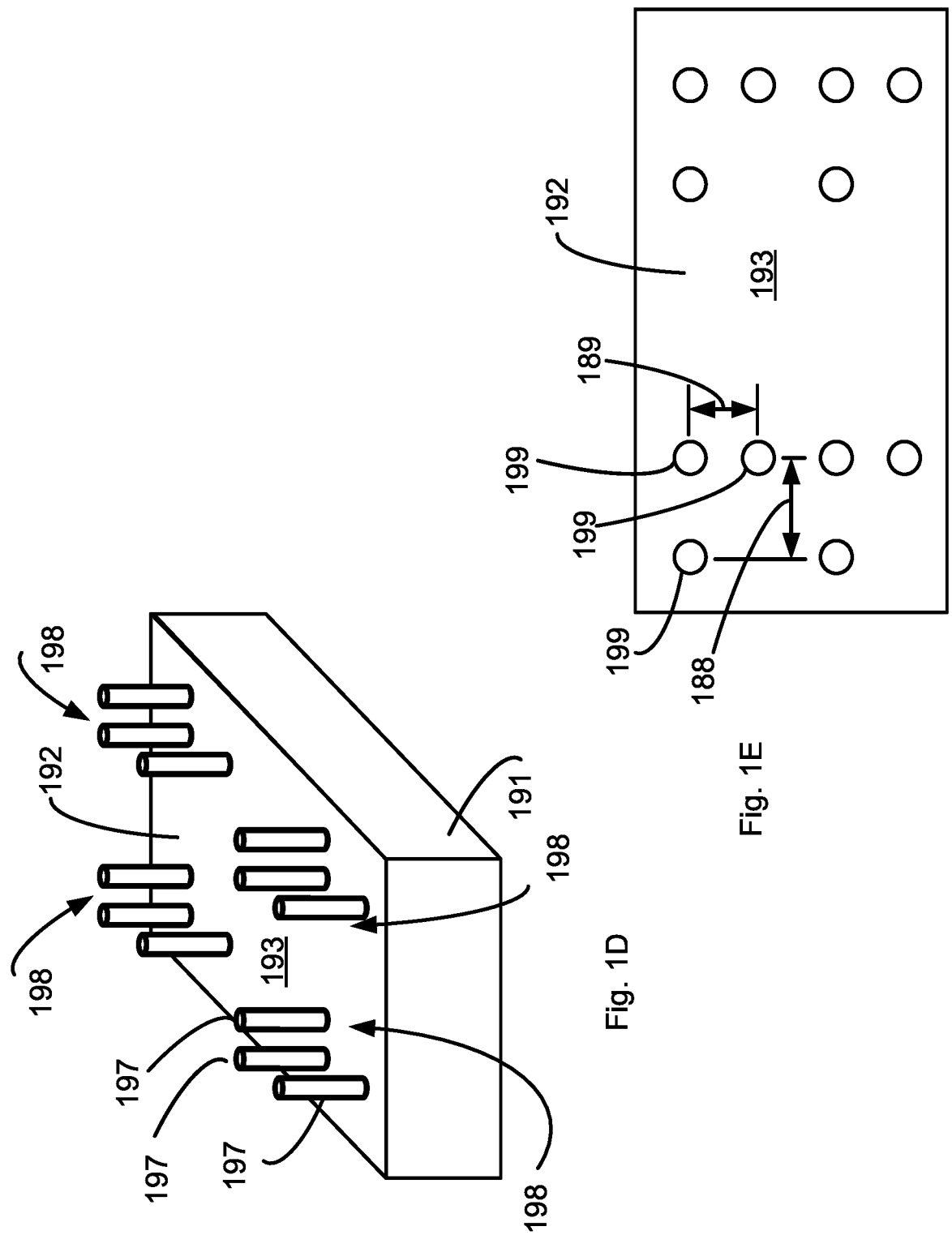

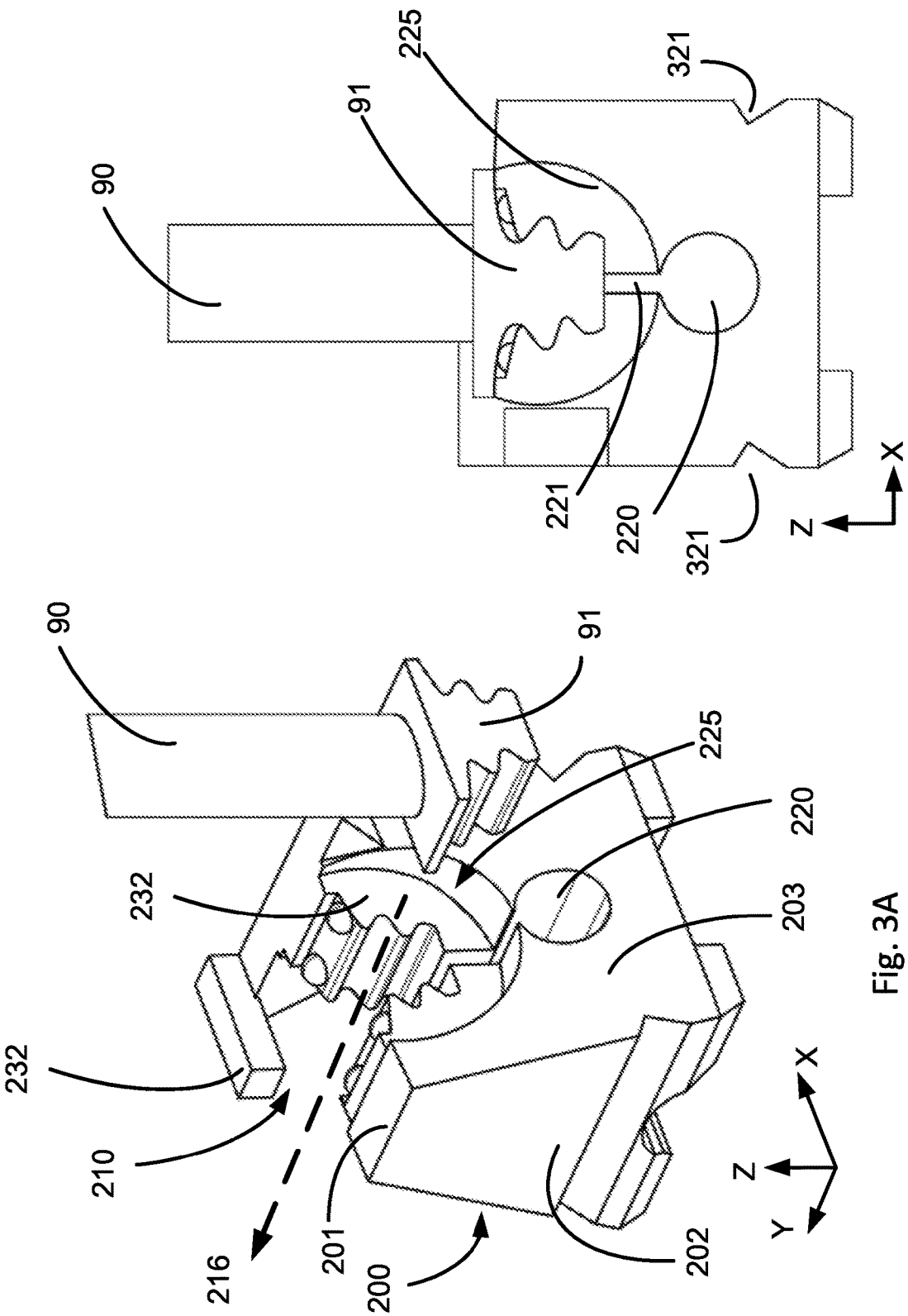

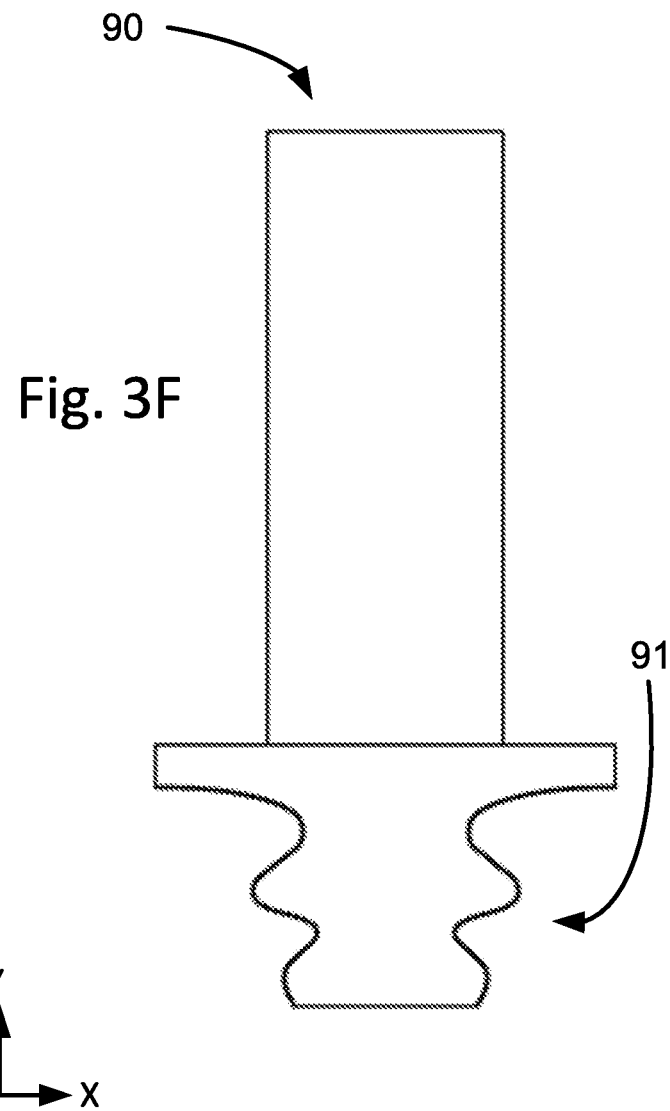
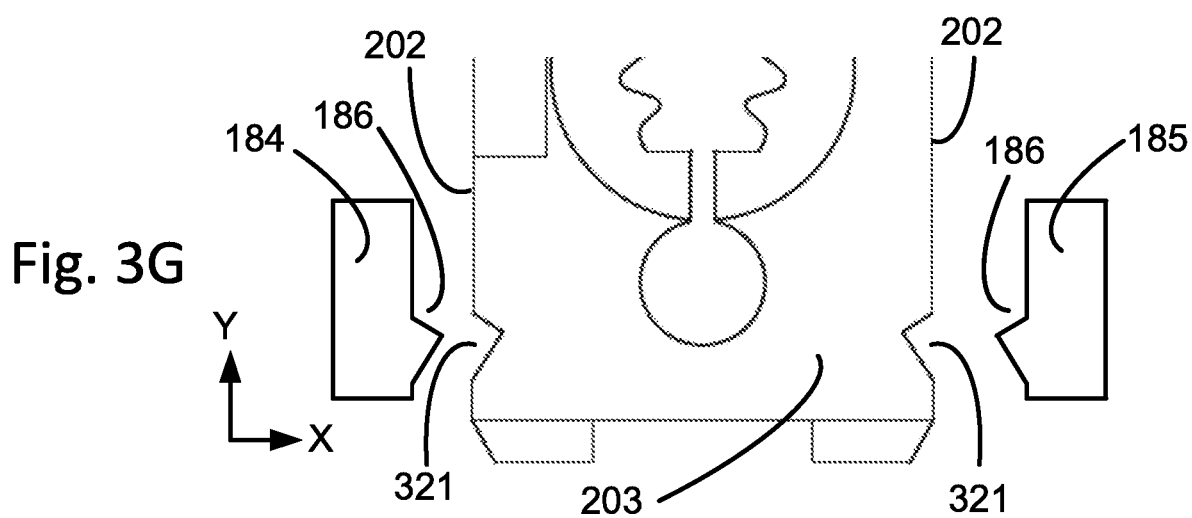

MODULAR WORKHOLDING APPARATUS

RELATED APPLICATIONS

This application claims priority to U.S. Provisional Application No. 62/728,414, filed Sep. 7, 2018 and titled "Modular Workholding Method for the Inspection of Manufactured Components" and naming Jonathan J. O'Hare and Jonathan Dove as inventors. The disclosure of the foregoing application is incorporated herein by reference, in its entirety.

FIELD OF THE INVENTION

The present invention relates to coordinate measuring machines, and more particularly to workholding for coordinate measuring machines.

BACKGROUND OF THE INVENTION

Workholding refers to the methods and tooling used to constrain components during various manufacturing processes. Tooling used for the purpose of workholding is also often referred to in industry as 'fixtures' or 'fixturing.'

Methods for workholding include clamping, screwing, vacuum holding, magnetic locking, gluing, etc. The development of workholding solutions is often expensive and time consuming because there is no one-size-fits-all or single general-purpose method to hold every type of component being manufactured. For example, flexible parts such as those in plastic medical devices may not be clamped or screwed down applying point loads since they would bend non-uniformly and deflect beyond and acceptable level. In such cases alternative methods such as vacuum holding is often used in place of clamps or other hard tooling devices.

Moreover, the manufacturing process for a single component may require a unique workholding solution for each operation. For example, a component may be sandcast in a first operation, then held in a large cradle fixture to mill some faces on one side in a second operation, then clamped down flat on that milled face for boring holes in a third operation. In this example each operation would have a different workholding solution since the component geometry changes with each operation.

It may also be noted that some components have features on all sides so that no one workholding solution can be used to make all the features of a component accessible at one time. This is particularly true for components at the end of the manufacturing process where final inspection is required. Inspection of components may be performed at any point during the manufacturing process, but final inspection is often the last operation and involves a more comprehensive inspection of a components features. At final inspection workholding is critical so that as many component features can be accurately inspected in the same setup as possible. The final inspection of manufactured components mostly involves dimensional measurements performed by coordinate measuring machines (CMMs), though other modes of inspection may also be performed. The present invention relates to coordinate measuring machines, and more particularly to workholding for coordinate measuring machines.

SUMMARY OF VARIOUS EMBODIMENTS

In accordance with one embodiment, a fixture (which may be referred-to as a "workholder") includes a workpiece interface shaped to receive and secure a target portion of a workpiece, and a base having a second interface configured to securely couple to a clamping system. The workholder is configured for use as an intermediary between a workpiece and coordinate measuring machine, and is not part of the workpiece and is not part of the coordinate measuring machine.

In some embodiments, the workpiece interface is shaped and sized, relative to the target portion of the workpiece, to provide a compressive force on the target portion of the workpiece when the workpiece is disposed in the workpiece interface. In some embodiments, the workpiece interface has a contour that is complementary to the shape of the target portion of a workpiece. In some embodiments, the workpiece interface includes (e.g., is made of) thermoplastic.

In some embodiments, the base has a bottom face, and the fixture further includes a plurality of cavities in the bottom face. The plurality of cavities are arranged in a pattern to match a corresponding pattern of dowels on a storage plate.

Some embodiments include a plurality of base magnets coupled to the base. That plurality of base magnets are arranged in a base pattern to match a corresponding pattern of storage magnets arranged on a storage plate. In some such embodiments, at least one of the base magnets is disposed in a polarity complementary to a corresponding storage magnet, in a storage system, which corresponding storage magnet is counterpart to the at least one of the base magnet. In some embodiments, each of a plurality of the base magnets is disposed in a polarity complementary to a corresponding counterpart storage magnet in a storage system.

In some embodiments, the base includes a set of base features, which base features are configured to interlock with counterpart features on a robotic gripper, and the same base features are configured to interlock with jaw reference features of a clamp, wherein the clamp is not the same as the robot gripper. In other embodiments, the base includes a plurality of base features, a first subset of which are configured to interlock with counterpart features on a robotic gripper, and a second subset of which are configured to interlock with jaw reference features of a clamp, where the first subset is not identical to the second subset.

The workpiece interface of the workholder may also be described as having one or more of the following properties: (a) the workpiece interface is shaped and sized, relative to the target portion of the workpiece, to provide a compressive force on the target portion of the workpiece when the workpiece is disposed in the first interface; (b) the workpiece interface includes (e.g., is made of) thermoplastic; and (c) the workpiece interface has a contour that is complementary to the shape of the target portion of a workpiece; and the base of the workholder may be described as having one or more of the following features: (i) the base has a bottom face, the fixture further including a plurality of cavities in the bottom face, the plurality of cavities arranged in a pattern to match a corresponding pattern of dowels on a storage plate; and (ii) a plurality of base magnets coupled to the base, the plurality of base magnets arranged in a base pattern to match a corresponding pattern of storage magnets arranged on a storage plate.

Another embodiment is directed to methods of producing a single-piece workholding apparatus. For example, one embodiment of a method of producing a single-piece workholding apparatus (for holding a workpiece during inspection by a coordinate measuring machine, wherein the workpiece has a target portion having a complex geometry) includes the following steps: measuring the complex geometry of the target portion to obtain a measured element; and creating a digital template by digitally subtracting the measured element from a template blank; and producing, from the digital template, the single-piece workholding apparatus comprising an interface having a fixed shape, the interface adapted to couple to the target portion of the workpiece.

In some embodiments, the template further comprising a standard clamping interface, and the method further includes producing, from the digital template, the single-piece workholding apparatus having a standard clamping interface.

Some embodiments produce the single-piece workholding apparatus by 3D printing the digital template. For example, some embodiments 3D print the single-piece workholding apparatus from thermoplastic. To that end, in some embodiments, the thermoplastic is one of ABS, HIPS, and Nylon.

In some embodiments, 3D printing the digital template includes producing the single-piece workholding apparatus via fused deposition modeling (FDM).

Yet another embodiment is directed to a workholder for holding a workpiece during inspection by a coordinate measuring machine, the workpiece having a target portion. The workholder includes: a base means for securely coupling to a clamping system; and a workpiece interface means for receiving and securing the target portion of the workpiece.

In some such embodiments, the base means has a bottom face, and a base means includes a plurality of cavities in the bottom face, the plurality of cavities arranged in a pattern to match a corresponding pattern of dowels on a storage plate. In some embodiments, the base further includes a plurality of base magnets coupled to the base means, the plurality of base magnets arranged in a base pattern to match a corresponding pattern of storage magnets arranged on a storage plate.

In some embodiments, the workpiece interface means is shaped and sized, relative to the target portion of the workpiece, to provide a compressive force on the target portion of the workpiece when the workpiece is disposed in the workpiece interface means. Moreover, in some embodiments the workpiece interface means has a contour that is complementary to the shape of the target portion of a workpiece.

The workpiece interface means in some embodiments of the workholder may be described as having one or more of the following properties: (a) the workpiece interface means is shaped and sized, relative to the target portion of the workpiece, to provide a compressive force on the target portion of the workpiece when the workpiece is disposed in the first interface; (b) the workpiece interface means includes (e.g., is made of) thermoplastic; and (c) the workpiece interface means has a contour that is complementary to the shape of the target portion of a workpiece; and the base means may be described as having one or more of the following features: (i) the base means has a bottom face, the fixture further comprising a plurality of cavities in the bottom face, the plurality of cavities arranged in a pattern to match a corresponding pattern of dowels on a storage plate; and (ii) a plurality of base magnets coupled to the base, the plurality of base magnets arranged in a base pattern to match a corresponding pattern of storage magnets arranged on a storage plate.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1D and FIG. 1E schematically illustrate another embodiment of a storage plate for storing workpiece holding apparatuses;

FIG. 3A schematically illustrates an embodiment of a workholder adapted to receive a workpiece;

FIG. 3B schematically illustrates an embodiment of a workholder holding a workpiece;

FIG. 3F schematically illustrates an embodiment of a workpiece;

FIG. 3G schematically illustrates embodiments of finger features of a robot gripper;

DESCRIPTION OF ILLUSTRATIVE EMBODIMENTS

Figure 1A:
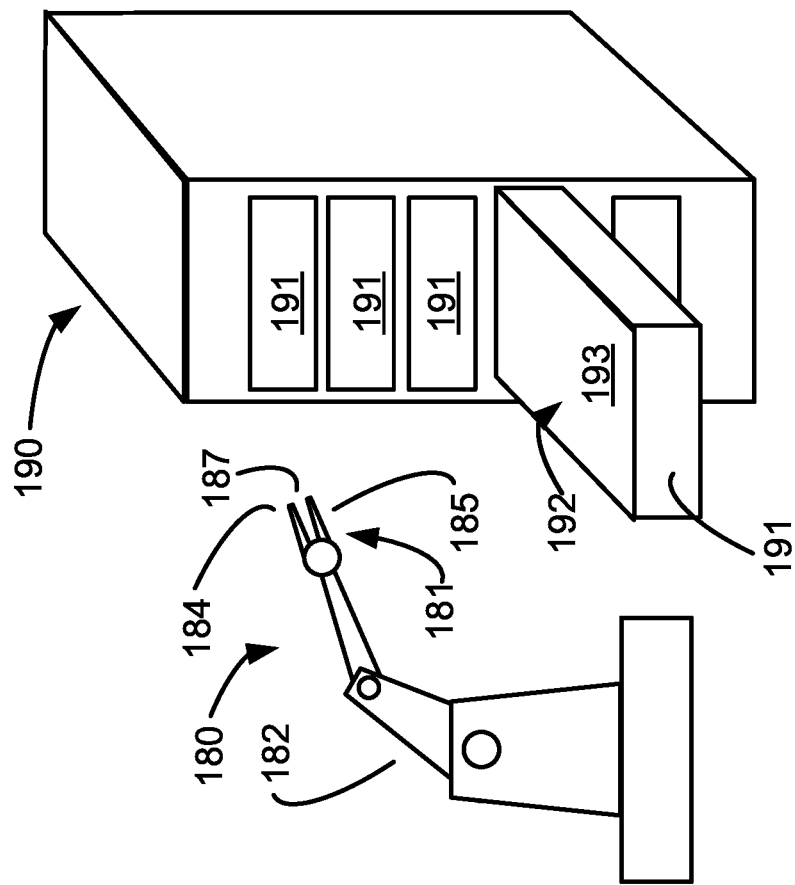
FIG. 1A schematically illustrates a coordinate measuring machine, a robot and a storage unit for storing workpieces.
Figure 1A:
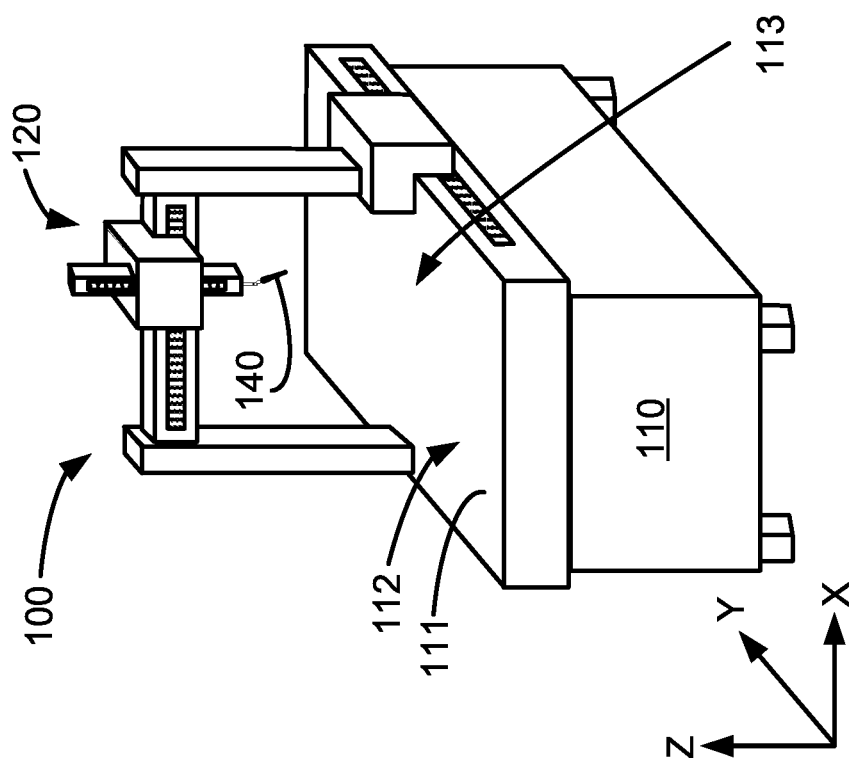

Illustrative embodiments provide an apparatus (which may be referred-to as a workholder) for constraining a workpiece (e.g., an object or manufactured component) during a manufacture process, such as inspection by a coordinate measuring machine. In illustrative embodiments, the workholder is configured for use as an intermediary between a workpiece and coordinate measuring machine, and is not part of the workpiece and is not part of the coordinate measuring machine.

Preferred embodiments have a workpiece interface (e.g., a slot, cavity or aperture) having a shape that is complementary to the shape of a target portion (e.g., a root form) of the workpiece, such that the workpiece can be press-fit into the workpiece interface.

Illustrative embodiments also have a clamp interface configured to securely couple to a clamping system. Each of a variety of workholders may have identical clamp interfaces so that each may securely couple to the same clamping system.

Illustrative embodiments take advantage of several benefits afforded by FDM (fused deposition modeling) technology. Although thermoplastics may seem unsuitable for many workholding applications in manufacturing, the inventors have recognized that these materials are flexible, durable, inexpensive and easy to form into any shape with accuracies better than 0.5 mm, and have recognized that these properties make thermoplastics desirable for use in the apparatuses and methods described herein, and in particular for inspection operations in manufacturing. This is so, in part, for inspection operations (such as measuring a workpiece using a CMM 100) since the loads imposed by most inspection instruments are quite low compared with that of tooling used in other manufacturing operations.

Definitions

As used in this description and the accompanying claims, the following terms shall have the meanings indicated, unless the context otherwise requires:

The term "complex geometry" means a geometry which is non-prismatic, and/or is bound by a multitude of non-orthogonal and or curved surfaces.

The term "ABS" means acrylonitrile-butadienestyrene.

The term "HIPS" means high impact polystyrene.

A "digital template" is a digital data file from which a workholder may be produced (e.g., machined, subtractively produced, additively produced, 3D-printed).

The term "fixed shape" means that the shape (e.g., of a feature of an apparatus) is fixed, and not adjustable. In some embodiments, a feature having a fixed shape may be pliable so that the apparatus can flex when accepting a workpiece, and yet the feature is still considered to have a fixed shape.

A "set" includes at least one member.

The term "target portion," in reference to a workpiece, means that portion of the workpiece that fits into a corresponding slot in an attachment. For example, but without limitation, in some workpieces the target portion may be a root form. In some workpieces, the target portion may have a shape described as a "complex geometry."

A "target workpiece" is a workpiece for which a workholder has a complementary shape.

A "template blank" is an object capable of being configured as a workholder apparatus. In some embodiments, a template blank is a digital data file capable of being modified, through a computer process, to form a template that includes an interface shaped to receive a target portion of a workpiece. In some embodiments, a template blank includes a standard clamping interface.

The term "workpiece" means an object to be held and constrained during a manufacturing operation. A workpiece may be an object to be measured by a coordinate measuring machine, such as a manufactured component, for example.

The workpieces in some illustrative embodiments described below include jet turbine blades. Some such jet turbine bladed includes complex geometry known in the aerospace industry as the "root form" of the blade. The depicted components in these examples are only meant to show a typical example of a component having complex geometry and is in no way intended to limit the application of the concepts disclosed herein to a single type of manufactured component having complex geometry or single industry. Other types of manufactured components where these concepts, methods and apparatuses may be successfully applied include orthopaedic implants, automotive powertrain components, and consumer electronics, to name but a few examples.

Environment

FIG. 1A schematically illustrates a working environment for various embodiments. As shown the environment includes a coordinate measuring machine 100, and robot 180, and a storage facility 190.

As known by those in the art, a coordinate measuring machine (or "CMM") is a system configured to measure one or more features of a workpiece. Coordinate measuring machines are represented in FIG. 1A by coordinate measuring machine 100.

In the illustrative embodiment of FIG. 1A, the CMM 100 includes a base 110 having a table 111. The table 111 of the CMM 100 defines an X-Y plane 112 that typically is parallel to the plane of the floor 101, and a Z-axis normal to the X-Y plane, and a corresponding X-Z plane and Y-Z plane. The table 111 also defines a boundary of a measuring space 113 above the table 111.

The CMM 100 also has movable features (collectively, 120) arranged to move and orient a measuring sensor 140 (and in some embodiments, a plurality of such devices) relative to the workpiece. The features of the CMM 100 are configured to move and orient the measuring sensor 140, relative to the workpiece, in one dimension (X-axis; Y-axis; or Z-axis), two dimensions (X-Y plane; X-Z plane; or Y-Z plane), or three dimensions (a volume defined by the X-axis, Y-axis, and Z-axis).

One or more workpieces 90 are stored in storage system 190. In this embodiment, the storage system 190 includes one or more drawers (or shelves) 191.

Robot 180 is disposed so that it can reach the drawer or shelf 191, as well as the table 111 of the coordinate measuring machine 100, so that the robot 180 can transport a workholder 200 (e.g., carrying a workpiece 90) the drawer or shelf 191 to the measuring space 113 of the coordinate measuring machine 100, and so that it can transport a workholder 200 (e.g., carrying a workpiece 90) from the measuring space 113 of the coordinate measuring machine 100 to the drawer or shelf 191. To that end, the robot 180 in this embodiment has a gripper 181 at the end of a movable, articulated arm 182.

Figure 3C:
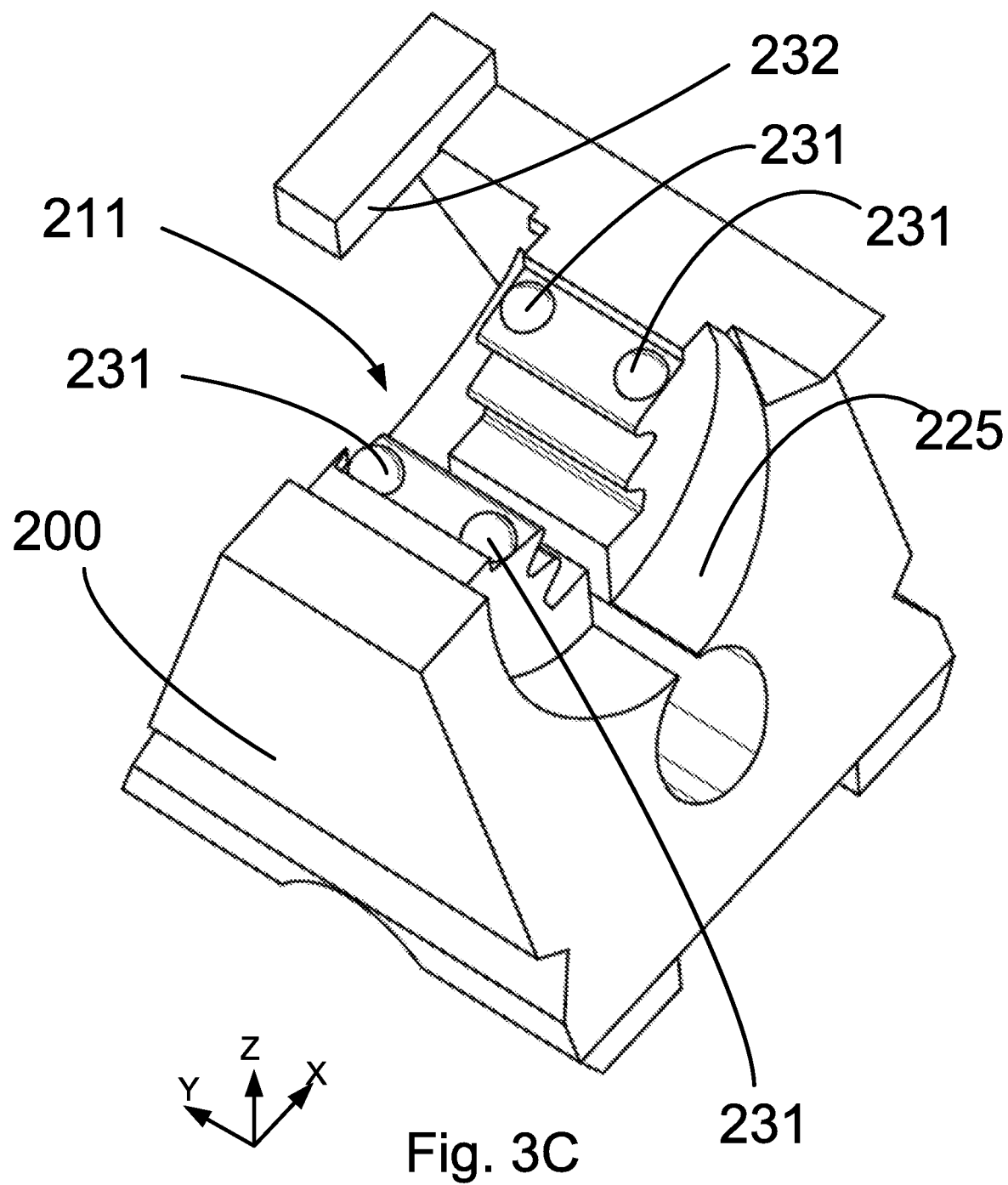
FIG. 3C schematically illustrates an embodiment of a workholder.

In some embodiments, the gripper 181 has two or more fingers 184, 185 separated by a gap 187. The gripper 181 is configured to controllably close and open the fingers 184, 185 to decrease or increase the gap 187 (respectively) so as to grasp and release (respectively) a workholder 200. Illustrative embodiments of the fingers 184, 185 include finger features 186 configured to mate with corresponding base reference features 320 on a workholder 200, as schematically illustrated in FIG. 3G. In illustrative embodiments, the finger features 186 have a shape that is complementary to the shape of corresponding base reference features 320 on an external surface 202 of a workholder 200. For example, as schematically illustrated in FIG. 3G, each of the base reference features 320 disposed on a side surface 202 is concave and has a triangular cross-section, and each of the finger features 186 is convex and also has a triangular cross-section. In operation, the fingers 184, 185 close on the workholder 200, and each finger feature 186 enters into and mates with a corresponding the base reference feature 320. When so mated, the gripper 181 has a secure, and releasable, grip on the workholder 200, and can move the workholder 200 from a drawer or shelf 191 to the measuring space 113 of the coordinate measuring machine 100, and/or from a measuring space 113 of the coordinate measuring machine 100 to a drawer or shelf 191. In other embodiments, the finger features 186 are concave and the base features 320 are convex. In other embodiments, one or more of the finger features 186 is concave and one or more of the finger features 186 is convex; and one or more of the base features 320 is convex and one or more of the base features 320 is concave, in each case so that each base feature has a shape that is complementary to the shape of a corresponding finger feature.

As can be understood from the foregoing description, the base 240 of the workholder 200, in such embodiments, includes base features 320 configured to interface with counterpart features on the gripper 181, and specifically on the gripper fingers 184 and 185, so as to enhance the accessibility and reliability of robotic gripping of the workholder 200 at their particular locations on the base 240. Moreover, in preferred embodiments the base features 320 serve a dual purpose: to interlock with the finger features 186 of the gripper 181, and also to interlock with jaw reference features 420 of a clamp 400, wherein the clamp 400 is not another robot gripper, and is not the same as, and not identical to, the robot gripper 181.

In other embodiments, the base 240 includes a plurality of base features 320, wherein a first subset of the base features 320 are configured to interlock with counterpart features 186 on a robotic gripper 181, and a second subset of the base features 320 are configured to interlock with counterpart jaw reference features 420 of a clamp 400, where the first subset is not identical to the second subset. For example, a first set of the base features 320 may include the groove feature 321 (configured to mate with counterpart feature 186 gripper 181), and a second set of the base feature 320 may include semi-circular feature 322 (configured to mate with semi-circular convex feature 422 on the clamp 400), in which case the first set is not identical to the second set. As another example, a first set of the base features 320 may include the groove feature 321, and a second set of the base feature 320 may include both the groove feature 321 and semi-circular feature 322, in which case the first set is not identical to the second set, even though they have a feature (in this example, groove feature 321) in common.

For purposes of this description and any claims, a surface of a gripper finger having a flat or planar face is not considered to have finger features.

Storage System

As schematically illustrated in FIG. 1A, each drawer or shelf 191 of a storage system 190 may have one or more storage plates 192 configured and disposed to hold the one or more workpieces 90. A storage plate 192 may have a plate surface 193.

In some embodiments, a storage plate 192 has a metal surface 193 such that a magnet would be attracted to the surface 193 of the storage plate. In other embodiments, the storage plate 192 has a non-metal and non-magnetic surface, which surface neither attracts nor repels a magnet.

Figure 1C:
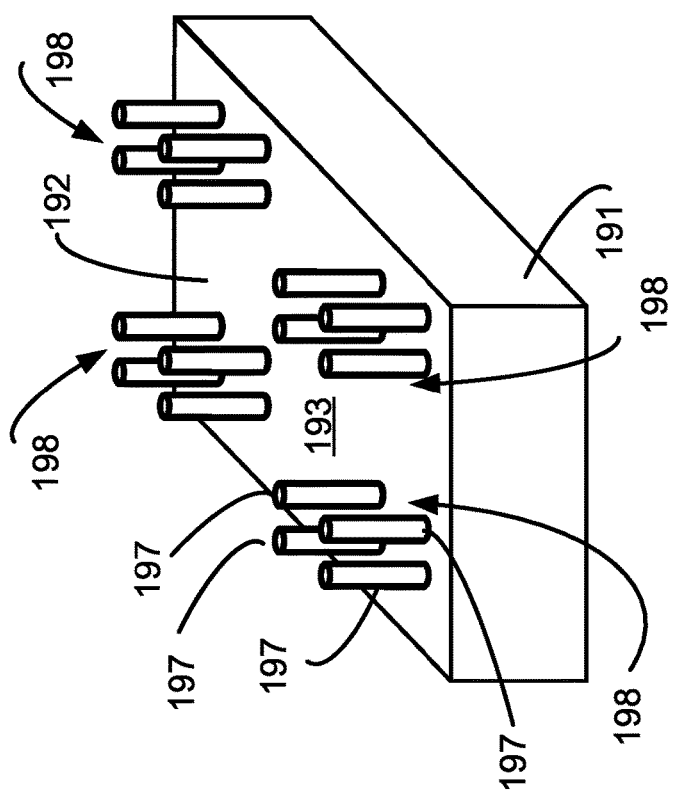
FIG. 1C schematically illustrates another embodiment of a storage plate for storing workpiece holding apparatuses.
Figure 1B:
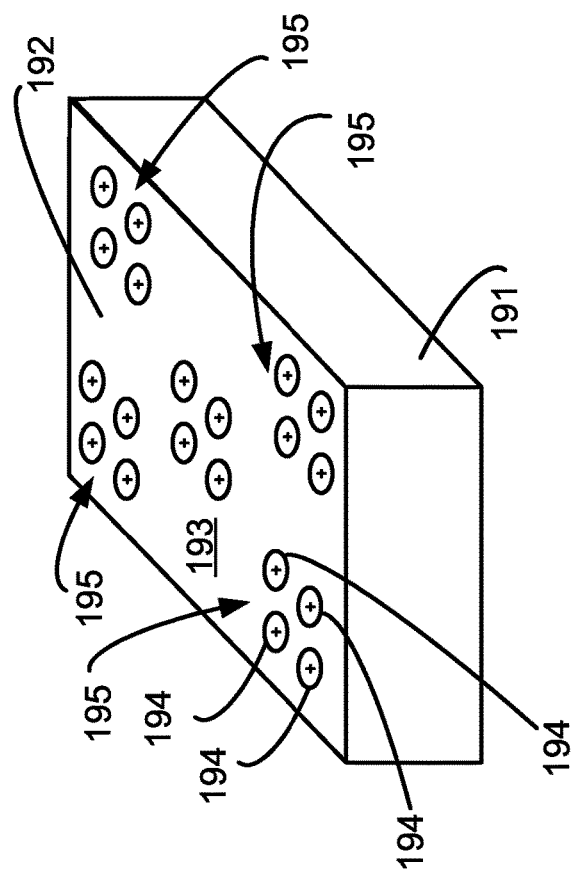
FIG. 1B schematically illustrates an embodiment of a storage plate for storing workpiece holding apparatuses.

Another embodiment of a storage plate 192 is schematically illustrated in FIG. 1B, and includes in or at its surface 193 a set of metal buttons 194. In one embodiments, the metal button 194 is a magnet 194. Each magnet 194 has a positive polarity on one surface, and a negative polarity on the opposing surface. The metal buttons 194 serve to hold a workholding apparatus 200 to the surface 193, for example when placed on the surface 193 by the robot 180. For example, in embodiments in which the metal button 194 is a magnet, each metal button 194 may be magnetically attracted to a counterpart metal button or magnet on the surface 193. In embodiments in which the metal button 194 is a not magnet, each such metal button 194 may be magnetically attracted to a counterpart magnetic button on the surface 193.

In preferred embodiments, several magnets 194 are arranged in a magnet group 195, and the storage plate 192 includes several such magnet groups. In illustrative embodiments, the magnets 194 in each magnet group 195 are arranged in a magnet pattern that mirrors a pattern of holder magnets 310 (described below as an embodiment of an alignment feature 250) in a workholder apparatus 200.

Another embodiment of a storage plate 192 is schematically illustrated in FIG. 1C, and includes, extending from its surface 193, several dowels 197.

In preferred embodiments, several dowels 197 are arranged in a dowel group 198, and the storage plate 192 includes several such dowel groups. In illustrative embodiments, the dowels 197 in each dowel group 198 are arranged in a dowel pattern that mirrors a pattern of dowel reception cavities in a holding apparatus 200.

In some embodiments, the arrangement of the plate alignment structures (e.g., magnets or metal buttons 194; dowel 197) are configured such that a workholder 200 may be placed on the alignment structures in only a single way. In other words, in such embodiments, the workpiece 200 will not fit on the alignment fixture in any position except the pre-defined orientation.

For example, in some embodiments, the magnets 194 of a magnet group 195 are arranged to define the three vertexes of an isosceles triangle (not an equilateral triangle), so that the corresponding base magnets 310 on a workpiece holder 200 align with the magnets of a magnet group only in one orientation. Moreover, in embodiments in which the alignment structures 250 are base magnets 310, the base magnets 310 may be disposed on or in the base 240 in a first polarity, and the magnets 194 on or in the plate 191 may be disposed in a second, opposite polarity, so that each of the base magnets 194 exhibits a magnetic attraction to its counterpart 310 magnet. In this way, if a workholder 200 is placed close to, but not exactly aligned with, the plate 194 magnets, the attraction between the base magnets 310 and the plate magnets 194 will serve to align the workholder 200 to its desired (proper) orientation.

As another example, in some embodiments the dowels 197 of a dowel group 198 are arranged to define the three vertexes of an isosceles triangle (not an equilateral triangle), so that the corresponding dowel cavities 250 (or "base" cavities) on a workholder 200 align with the dowels of a dowel group 198 only in one orientation. For example, FIG. 1D schematically illustrates an embodiment of a storage plate 192 in which dowels 197 in each dowel group 198 are arranged in an asymmetrical pattern to define a specific orientation of a workholder 200.

For example, FIG. 1E schematically illustrates a pattern of alignment structures 199 (which in various embodiments could be metal buttons 194 or dowels 197), which pattern defines the three vertexes of an isosceles triangle. A first leg of the triangle has a length 188 that is not equal to the length 189 of a second leg of the triangle, where neither the first leg nor the second leg is the hypotenuse.

In embodiments in which the alignment structures 199 are dowels 197, a workholder 200 has corresponding dowel cavities 250 arranged in the same triangle so that when dowels 197 engage the dowel cavities 250, the workholder 200 fits onto the dowel group 198 in only one orientation.

In embodiments in which the alignment structures 199 are metal buttons, a workholder 200 may have counterpart securing structure 250, such as a magnet or non-magnetic metal.

Although the foregoing examples illustrate alignment structures arranged to form the vertexes of an isosceles triangle, embodiments are not limited to that geometric shape. Other embodiments may arrange or configure the alignment structures 250 to form other shapes, as long as those shapes do not permit a workholder 200 to be coupled to the alignment structures in more than one orientation. Other embodiments arrange the alignment structures to form other triangles or a trapezoid, or a trapezium, to name but a few examples.

Workholder

Figure 2B:
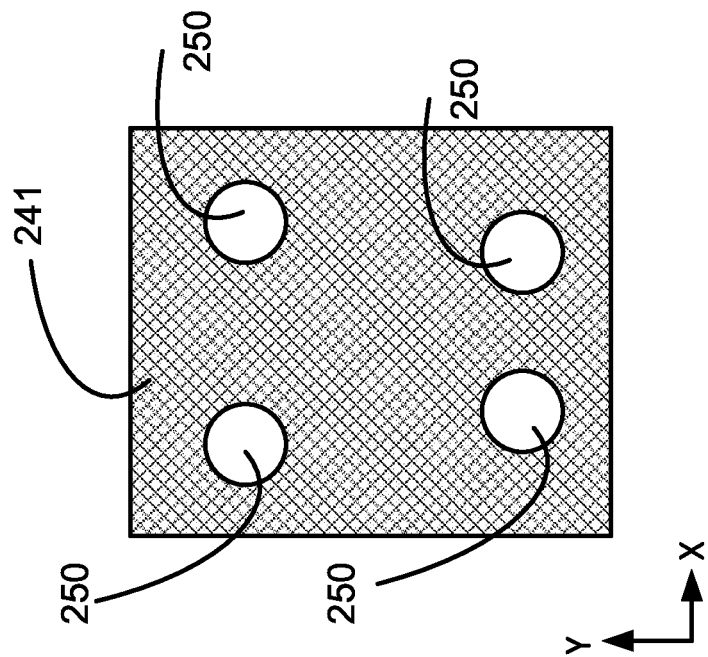
FIG. 2A, FIG. 2B, and FIG. 2C schematically illustrates an embodiment of a workpiece holding apparatus.
Figure 2A:
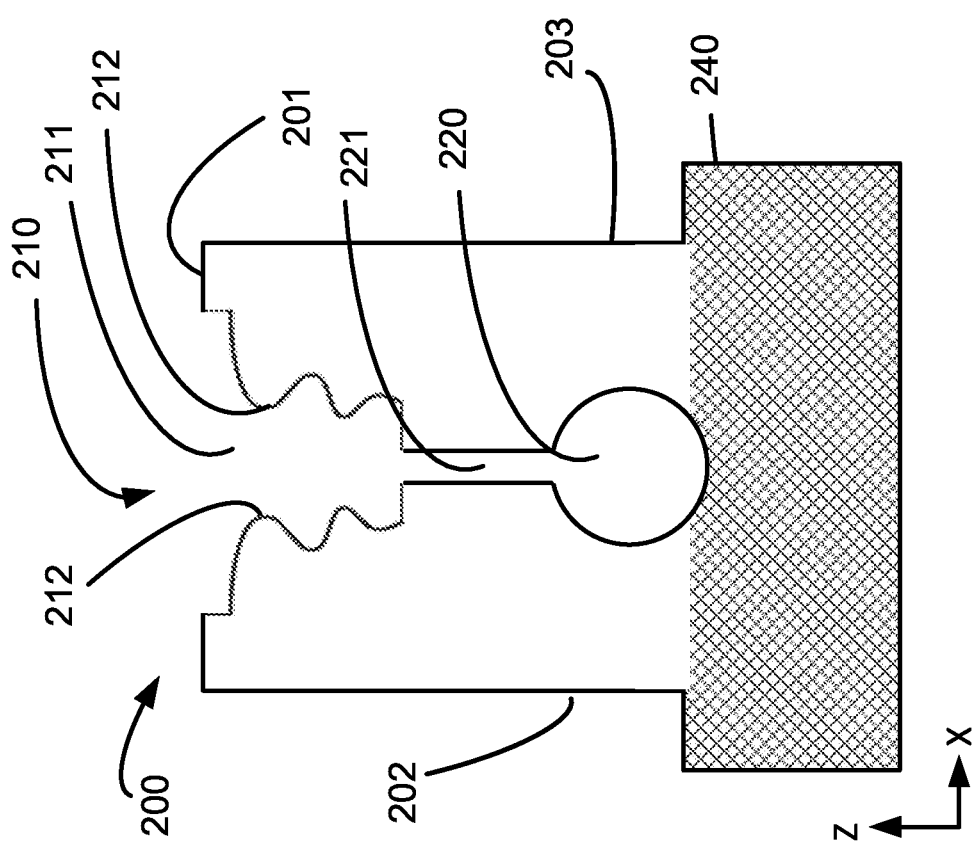
Figure 2C:
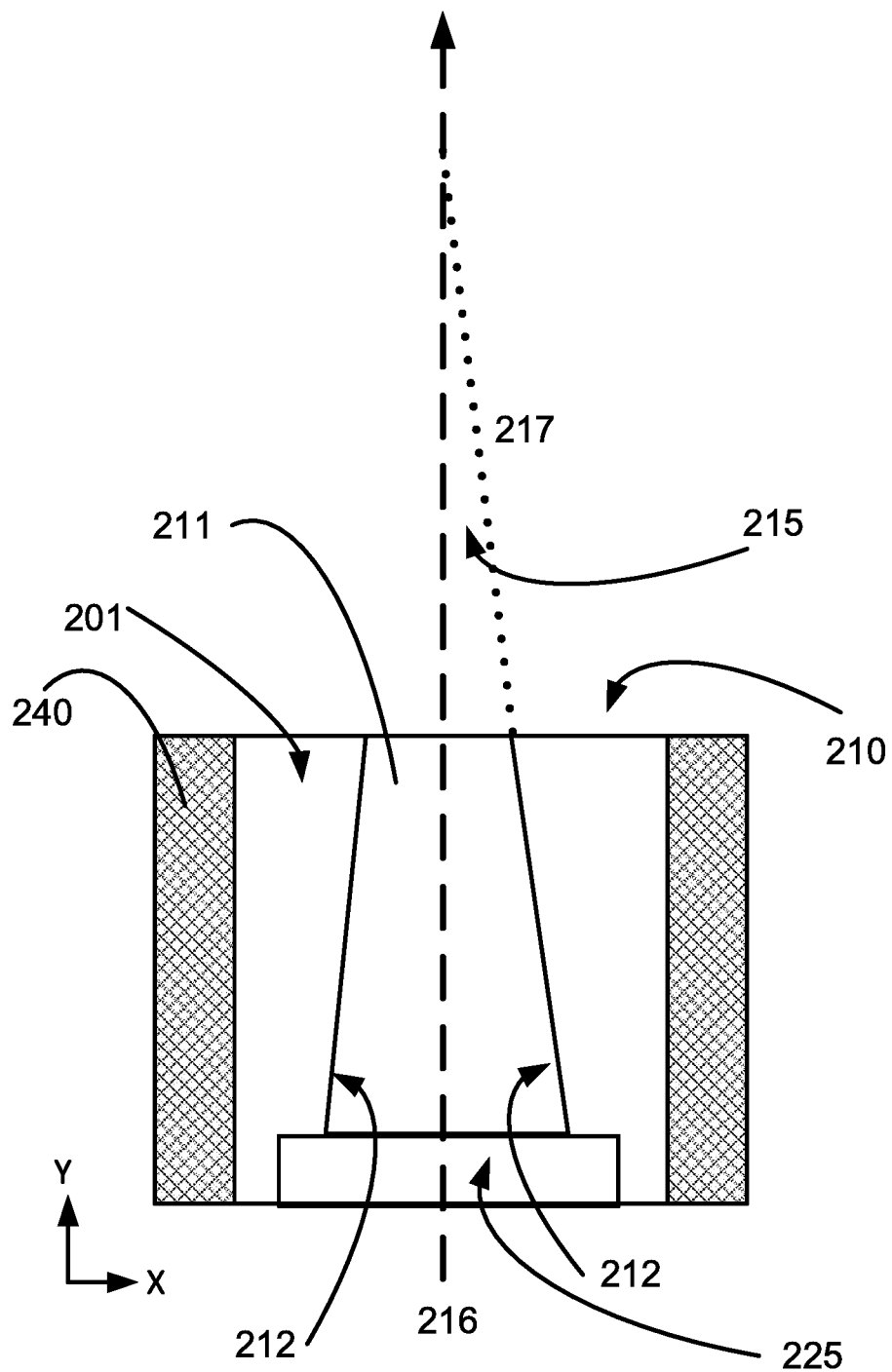

FIG. 2A, FIG. 2B, and FIG. 2C schematically illustrate an embodiment of a workholder 200. FIG. 3A, FIG. 3B, FIG. 3C, FIG. 3D and FIG. 3E schematically illustrate other embodiments of a workholder 200.

A workholder 200 includes a workpiece interface 210, configured to secure a workpiece 90 to the workholder 200, and a base 240 configured to secure the workholder 200 to another object, such as a clamp 400 for example. Consequently, the base 240 may be referred to as a "clamp interface," although embodiments of workholder 200 do not necessarily require a clamp to be secured, for example, to a coordinate measuring machine.

Various embodiments of workholders 200, workpiece interfaces 210 and bases 240 are described below. A workholder 200 may include any workpiece interface 210 and any base 240. Each of the embodiments of workholder 200 may be a single-piece apparatus in which the workpiece interface 210 is integral with the base 240. For example, a workholder 200 fabricated by 3D printing may be such a single-piece apparatus. Embodiments of workholders 200 are not limited to such printed apparatuses, however. In some embodiments, the workpiece interface 210 is a separate part from the base 240. In such embodiments, the workpiece 210 may be coupled or affixed to the base 240 to form a single-piece workholder 200.

Workpiece Interface

FIG. 2A and FIG. 2B schematically illustrate an embodiment of a workholder 200 having an embodiment of a workpiece interface 210.

The workpiece interface 210 includes a workpiece slot 211 (or cavity), which slot 211 is configured to securely hold the workpiece. For example, in some embodiments, the slot 211 has a shape or contours that are complementary to the shape or contours of a target portion of a target workpiece 90. In other words, in such embodiments, the workholder and target workpiece have a complementary relationship. Indeed, with some embodiments, the workpiece interface 210 is configured to fit exclusively to a specific target workpiece 90.

In this way, the workholder 200 in effect takes the place of (the complex geometry of) the workpiece 90, as a reference surface, making it much easier to handle or clamp the workpiece 90 into a standard vise. In other words, rather than clamp the (complex geometry of a portion of) the workpiece 90 into a vise, the workholder 200 acts as an intermediary between the workpiece 90 and the vise (or other clamping device) 400. To that end, in some embodiments the base 240 of the workholder 200 has a clamp interface, embodiments of which are described in more detail below.

FIG. 2C schematically illustrates a view of the top 201 of the workholder 200. To secure the workpiece 90, e.g., by providing a tight fit, in some embodiments, the slot 211 of the workpiece interface 210 is extruded in a shape that is complementary to the profile of the target portion of the workpiece 90 to being held (the target workpiece) but with one or more dimensions configured to provide a small amount interference so that the walls 212 of the slot 211 apply a preload against the workpiece 90 sufficient to restrain (or prevent movement of) the workpiece 90 to a degree sufficient for measuring the workpiece 90 by a coordinate measuring machine 100.

FIG. 3A, FIG. 3B, FIG. 3C, FIG. 3D and FIG. 3E schematically illustrate other embodiments of a workholder 200. In these embodiments, the workpiece interface 210 may be formed of thermoplastic. Preferred thermoplastic materials for this method are ABS, HIPS and Nylon although other materials, including those containing carbon or glass fibers, may also be used.

To achieve such a tight fit, the workpiece interface 210 is designed having a slot 211 extruded in the same shape or profile as the workpiece 90 to be held, but with a small amount physical interference so that the walls 212 of the thermoplastic slot 210 apply enough preload against the workpiece 90 to prevent movement.

The amount of interference can be made gradual by tapering the extrusion between −1 and −5 degrees so that it is easier to insert the component initially, but gets tighter as it is inserted all the way into the workholder 200. Such a taper is schematically illustrated in FIG. 2C, which includes a dashed arrow 216 to indicate a longitudinal axis of the slot 211 (and which also represents the direction of insertion of a workpiece), and a dotted line 217 to indicate the angle 215 formed by the axis 216 (or direction of insertion) and a wall 212 of the slot 211. As a workpiece 90 is inserted into the slot 211, by moving the workpiece in the direction of insertion 216, the workpiece 90 enters the slot 211. As a leading edge of the workpiece 90 proceeds into and along the slot 211, the width of the slot 211 narrows, thereby getting tighter by gradually increasing the pressure from the walls 212 onto the workpiece 90.

That taper angle 215 may be, in illustrative embodiments, −1 degree, or −5 degrees, or any angle between −1 and −5 degrees (e.g., −2 degrees, −3 degrees, −4 degrees, etc.). For a workpiece interface 210 made of thermoplastic, the inventors have discovered that the upper limit for such a taper angle 215 is −5% over a 25 mm extrusion; otherwise the thermoplastic material will likely exceed its yield point and fracture.

Another feature of some embodiments of workholder 200 is one or more relief openings 220 below the insertion slot 211. Such a relief opening 220 is ideally a cylindrical bore, although other (potentially less effective) shapes may be used. The purpose of a relief opening 220 is to allow for flexure and stress distribution in the workpiece interface 210 (e.g., when the workpiece interface 210 is made of thermoplastic), which may arise due to the forces being applied by a workpiece 90 is compression fitted into it. A person of ordinary skill in the art, in possession of this description, would be able to determine and apply acceptable shapes and dimension of one or more relief openings 220 (e.g., the correct radius for a bore), based on the material, loading and deflection requirements. The principals are the same as employed in the art of designing relief springs for other applications.

In preferred embodiments, the relief opening, 220, is connected to the insertion slot 211 via a keyway, 221, such that, in an embodiment in which the relieve opening 220 includes a cylindrical bore, all features are parallel with the cylinder axis of the relief opening 220. This relief opening 220 is also positioned such that it is approximately equidistant from all of the external sides (201, 202, 203, 241) of the attachment workholder 200 so that the stresses are more evenly distributed throughout the material.

Preferred embodiments of a workholder 200 include (to help with constraining the workpiece 90 within the slot 211) one or more locating datum points 231 disposed such that they are distributed across one or more surfaces 212 of the workpiece 90, to interface 210 between such one or more surfaces of the workpiece 90 and the workpiece interface 210. These locating points, 231 in FIG. 3C, may be or include raised surfaces in the form of spherical, cylindrical or square bumps or otherwise protruding high points in the surface 212 in order to distribute contact loading and prevent any movement between the workpiece 90 and the workpiece interface 210.

Further to the purpose of constraining the workpiece 90 in the workholder 200, some embodiments include at least one reference feature 232 that acts as a datum for the purpose of constraining the last remaining degree of freedom of the workpiece 90 within the workpiece interface 210. In the FIG. 3C, that degree of freedom is in the direction of the Y axis, and the described reference feature, 232, is depicted as a rectangular stop to define the end of travel of a workpiece 90 through the slot 211, but in other embodiments may be in the form of some other geometry which has the same purpose.

Some embodiments of the workholder 200 include an undercut or countersink area 225 (schematically illustrated in FIG. 3A) to allow access (for example, by the probe of a coordinate measuring machine) to the complex geometry of a workpiece 90 while that workpiece 90 is secured in the workpiece interface 210.

Base (Clamp Interface)

Figure 3E:
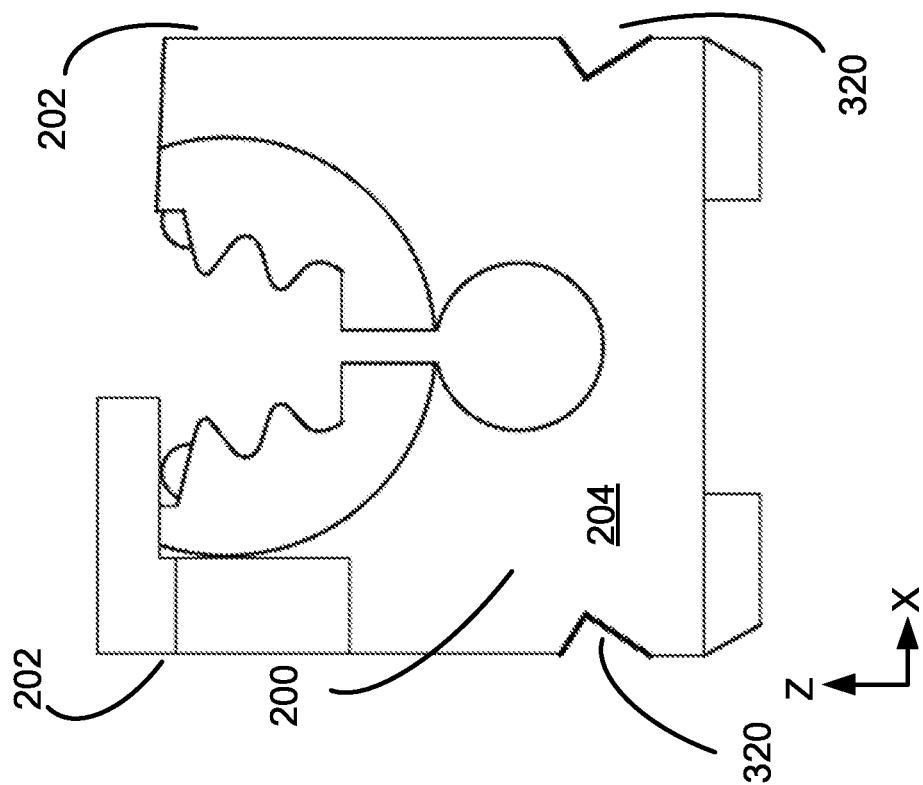
FIG. 3D and FIG. 3E each schematically illustrates an embodiment of a workholder.
Figure 3D:
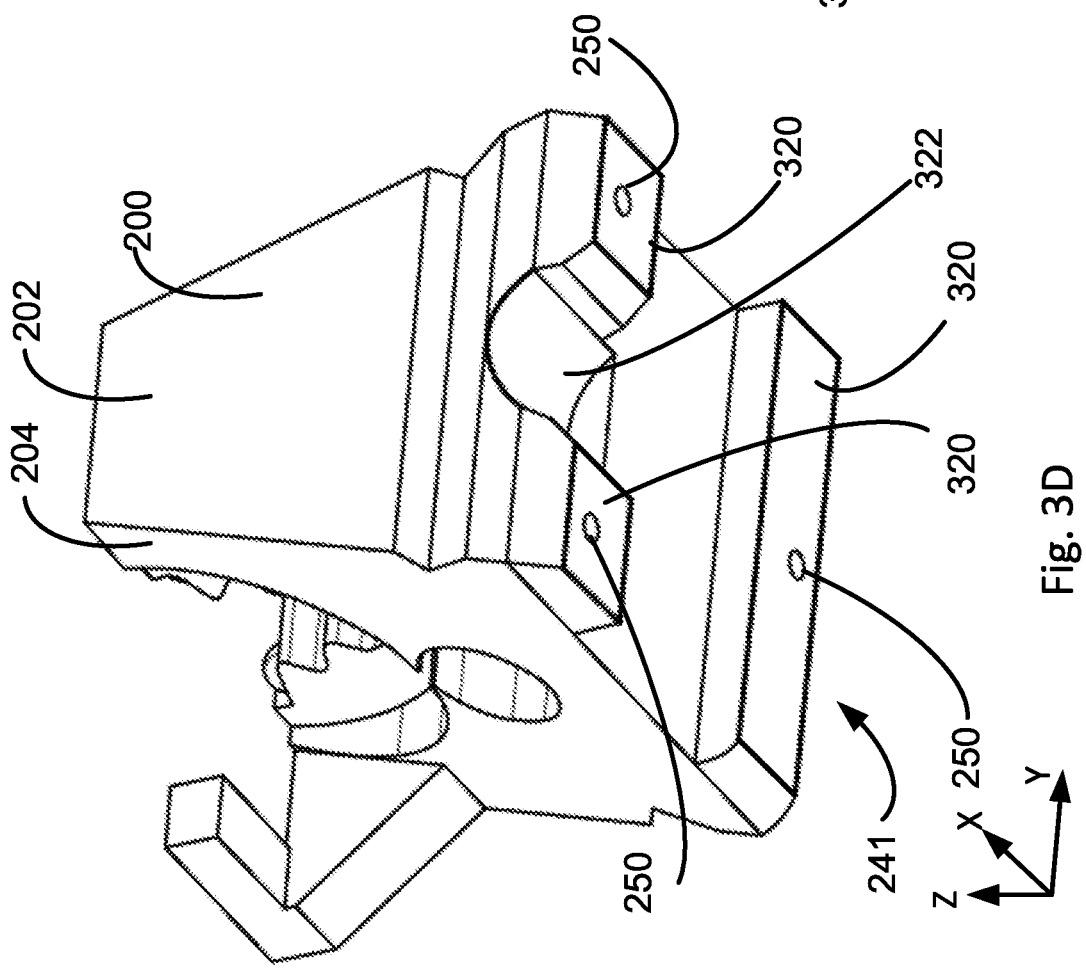
Figure 4B:
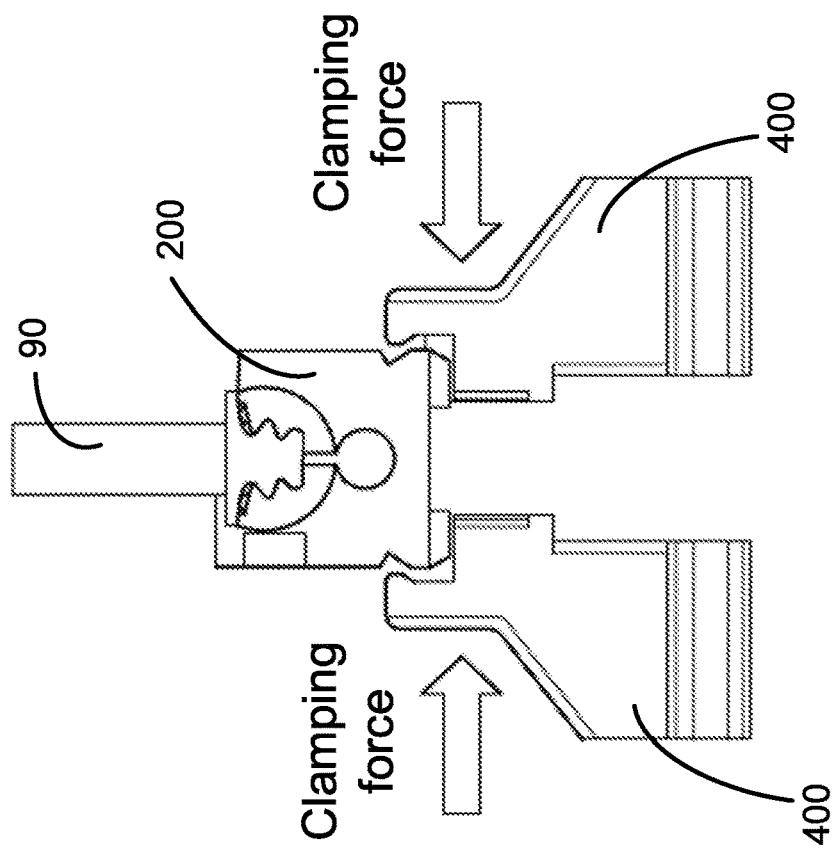
FIG. 4B schematically illustrates an embodiment of a clamping system receiving a workholder.
Figure 4A:
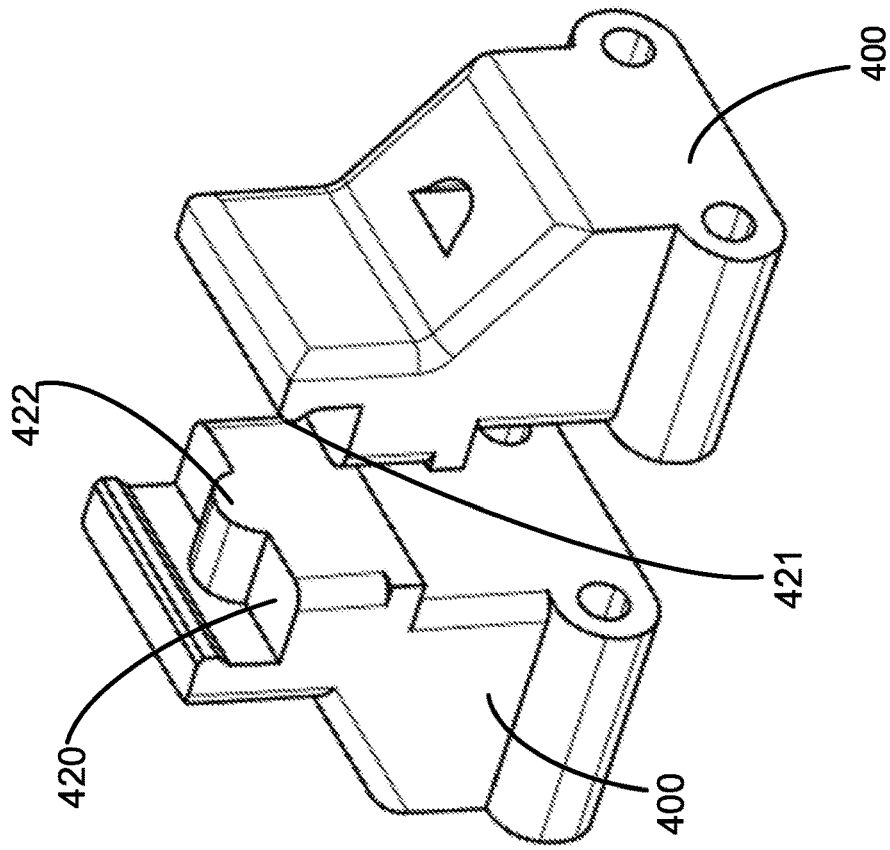
FIG. 4A schematically illustrates an embodiment of a clamping system.

Illustrative embodiments of the base 240 of a workholder 200 include reference surfaces and or base reference features, 320 in FIG. 3D and FIG. 3E, by which the workholder 200 may be repeatably and securably placed into a common clamping device, 400 in FIG. 4A and FIG. 4B, to be held during an inspection operation. For example, in illustrative embodiments, the clamp 400 is configured to rest on a coordinate measuring machine 100, to hold a workpiece 90 in position on the table 111 of a coordinate measuring machine 100 as the coordinate measuring machine 100 takes measurements of or otherwise inspects the workpiece 90.

The common clamping device, 400, may be in the form of a vise with jaws with jaw reference features, 420, as depicted in FIG. 4A and FIG. 4B, which interface with, interlock with, or otherwise lock onto the reference features, 320, of the workholder 200. To that end, in preferred embodiments, the shape(s) of the base reference features 320 on the workholder 200 are complementary to the shape(s) corresponding jaw reference features 420 of the clamping device 400. For example, convex jaw reference feature 421 of FIG. 4A (which may be referred-to as a "ridge") has a triangular cross-section that mates with the concave base reference feature 321 (which may be described as a "groove") of the base 240, which has a concave triangular cross-section. As another example, convex jaw reference feature 422 of FIG. 4A has a semi-circular cross-section that mates with the base reference feature 322 of the base 240 (FIG. 3D), which has a concave circular cross section.

A plurality of workholders 200 may have identical clamp interfaces 240 (in other words, they may have the same reference surfaces for clamping), even though each of the plurality of workholders 200 is configured to hold a different workpiece 90 (in other words, each of the plurality of workholders 200 is configured to hold a different target workpiece (see, e.g., workpieces 90A and 90B), the target workpieces each having a different complex geometry). In this way, the workholders 200 are modular in that any variant of workpieces 90 with a corresponding variant of workpiece geometry may be held for inspection using the same clamping device 400 by using, between the workpiece 90 and the clamping device 400, a corresponding workholder 200, all without having to change, retool or adapt the clamping device 400.

In some embodiments, the base reference features 320 are configured to interface with both the jaw reference features 420 of the clamping device 400 as well as the finger features 186 of gripper fingers 184, 185, as described above in connection with FIG. 3G.

Some embodiments of the workholder 200 include one or more alignment features 250 on or in the bottom 241 of the base 240.

For example, in some embodiments an alignment feature 250 is a magnet 310 in the bottom of the workholder 200. Such magnets 310 may be part of the base 240, but may have function not related to the clamp interface. For example, magnets 310, which in preferred embodiments are permanent magnets, assist with securing the workholder 200 flat on a metallic or magnetic surface 193 of a storage apparatus 191, so that the workholder 200 remains, reliably, in the location where it is place (e.g., by a robot 180) so that the workholder 200 is available at that known location when the workholder 200 (or a workpiece 90 secured in the workholder 200) next needed, and/or does not slide around during movement or transport pf the storage apparatus 192. Such magnets 310 may also prevent the components 90 (workpieces) from toppling over if they are top-heavy.

In some embodiments, the alignment feature 250 is a dowel receiving cavity 251 configured to receive a dowel, such as a dowel 197 extending from a storage plate 192. A plurality of such dowel receiving cavities may be arranged in a pattern to mirror a dowel patter 198, so that the base 240 fits onto the dowel patter 197.

Clamping Device

Figure 5A:
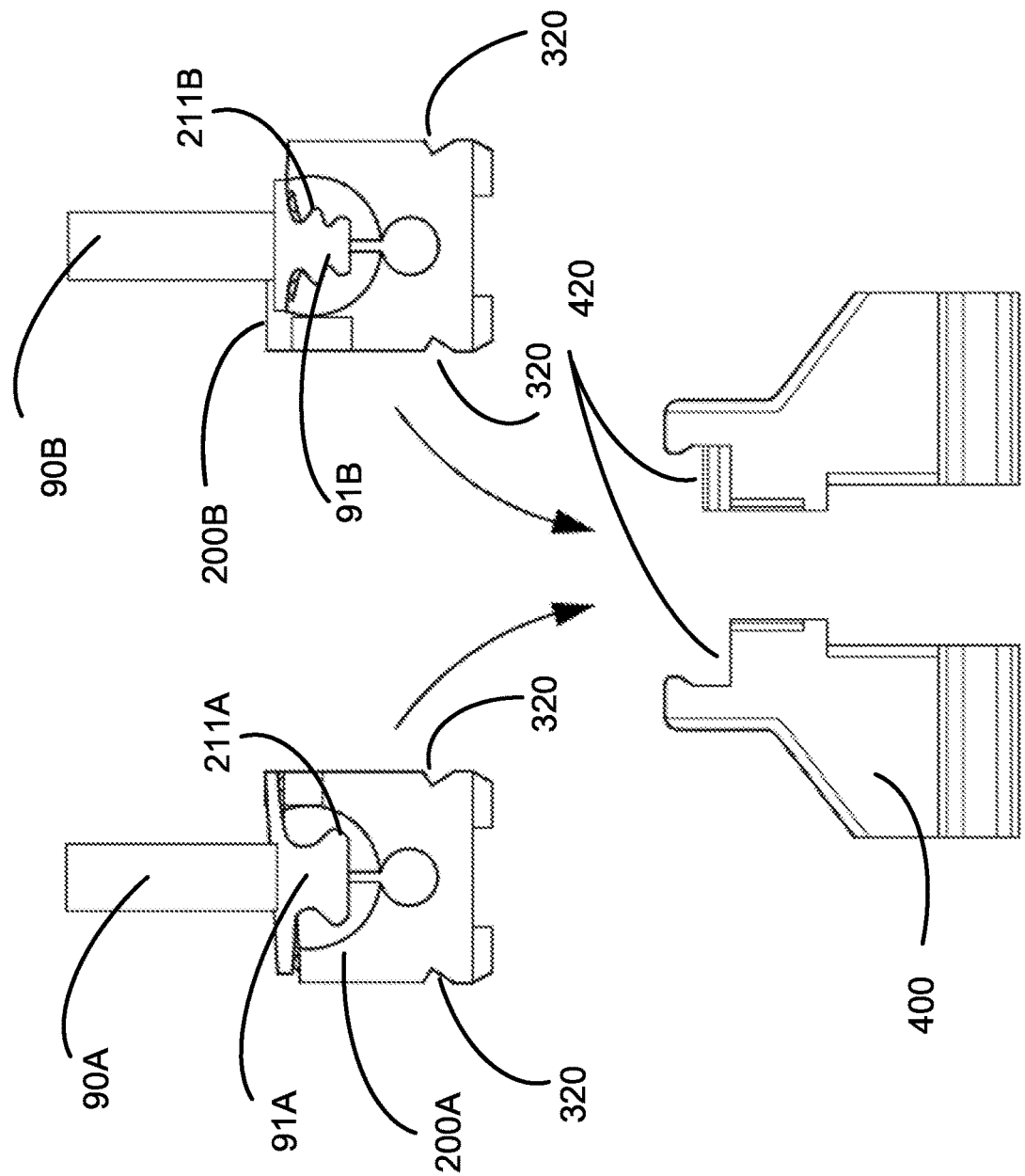
FIG. 5A schematically illustrates a clamping system serially receiving a first workholder and a second workholder.

In FIG. 5A, two different workpieces (90A and 90B, respectively) having different complex geometries, are each shown attached to a flexible attachment (200A and 200B, respectively), with insertion slots (211A and 211B, respectively) suited for constraining complex geometries, 91A and 91B. Each attachment 200A and 200B is also shown having the same reference surfaces, 320, for modular clamping into a common clamping device, 400.

FIG. 5A illustrates that present embodiments enable a way to eliminate setup changes between different components through the use of inexpensive modular attachments.

Figure 5B:
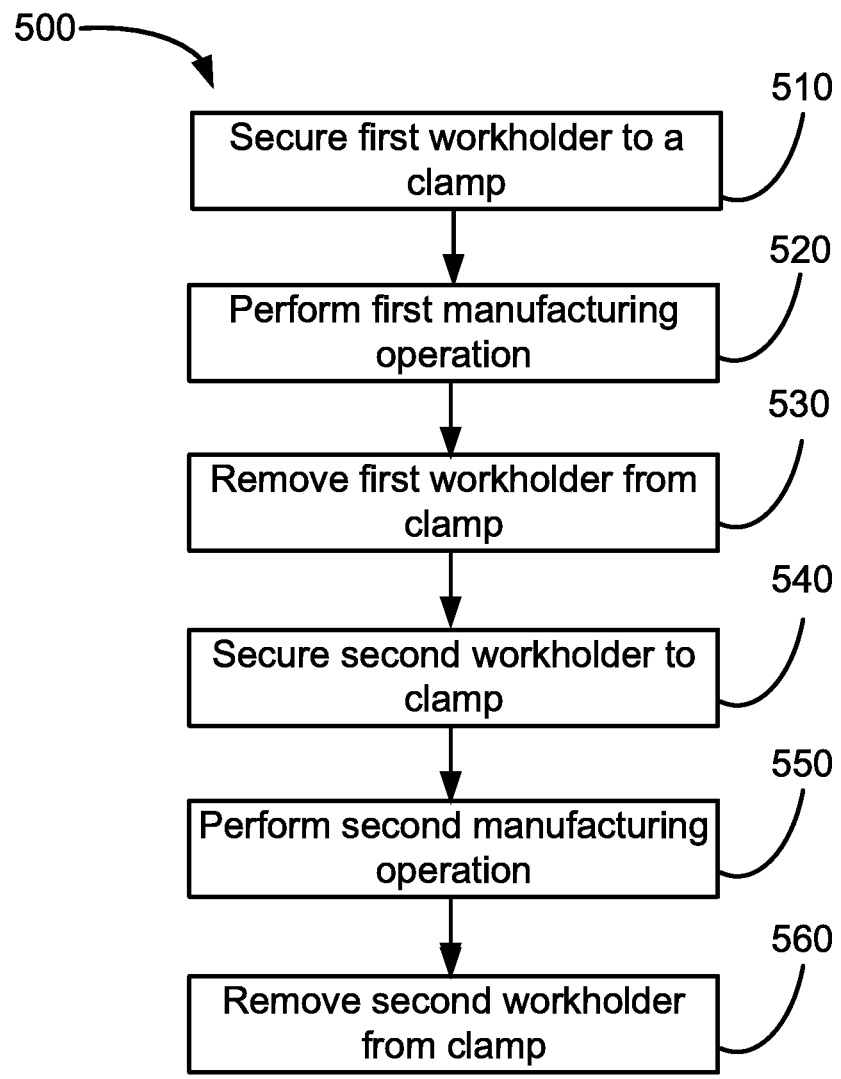
FIG. 5B is a flow chart that illustrates a method of using a plurality of non-identical workholders without changing a clamping setup.

For example, a method 500 of using a plurality of non-identical workholders without changing a clamping setup may be described by the flow chart in FIG. 5B.

At step 510, if a first workholder 200A is not already in a clamp 400, a workholder 200A carrying a workpiece 90A is secured to a clamp 400.

The first workholder 200A has a first workpiece interface 210A configured to secure the first workpiece 90A. For example, in preferred embodiments, the first workpiece interface 210A is customized to mate to a first target portion 91A of the first workpiece 90A.

The first workholder 200A has a first clamp interface 240A configured to mate with jaw reference features 420 of the clamp 400. For example, the first clamp interface 240A may have attachment reference features 320 as described herein.

At step 520, a manufacturing operation is performed on the workpiece 90A, while the workpiece 90A is secured to the workholder 200A, and the workholder 200A is secured to the clamp 400 via clamp interface 240. For example, a manufacturing operation may include measuring the workpiece 90A using a coordinate measuring machine 100.

At step 530, the workholder 200A is removed from the clamp 400. The clamp 400 is now free to accept another workholder.

At step 540, a second workholder 200B, carrying a workpiece 90B, is secured to the clamp 400, without changing the clamp 400 or the setup of the clamp 200. The second workholder 200B has a second workpiece interface 210B configured to secure the second workpiece 90B. For example, in preferred embodiments, the second workpiece interface 210B is customized to mate to a second target portion 91B of the second workpiece 90B, wherein the second target portion 91B is not identical to the first target portion 91A.

In illustrative embodiments, the second workpiece 90B is not identical to the first workpiece 90A, and thus the second workholder 200B is not identical to the first workholder 200A at least in that the second workholder 200B has a second workpiece interface 240B that is not identical to the first workpiece interface 240A.

The second workholder 200B has a second clamp interface 240B configured to mate with the same attachment reference features 320 of the clamp 400. In illustrative embodiments, the second clamp interface 240B is functionally identical to the first clamp interface 240A, in that each of the second clamp interface 240B and the first clamp interface 240A mate to at least some of the same attachment reference features 320 of the clamp 400. In preferred embodiments, the second clamp interface 240B is physically identical to the first clamp interface 240A, in that the attachment reference features 320 of the first clamp interface 240A are identical to the attachment reference features 320 of the second clamp interface 240B.

At step 550, the method performs a manufacturing operation on the second workpiece 90B, which manufacturing operation may be referred-to as a second manufacturing operation.

At step 560, the second workholder 200B is removed from the clamp 400. The clamp 400 is now free to accept another workholder.

As can be understood from the foregoing, FIG. 5A presents a securing system (which may be secured to a coordinate measuring machine 100), which systems is configured to receive serially, and without changing the setup of the securing system, a first workholder 200A (and its workpiece 90A) and a second workholder 200B (and its workpiece 90B).

A Method of Fabricating a Workholder

Figure 6A:
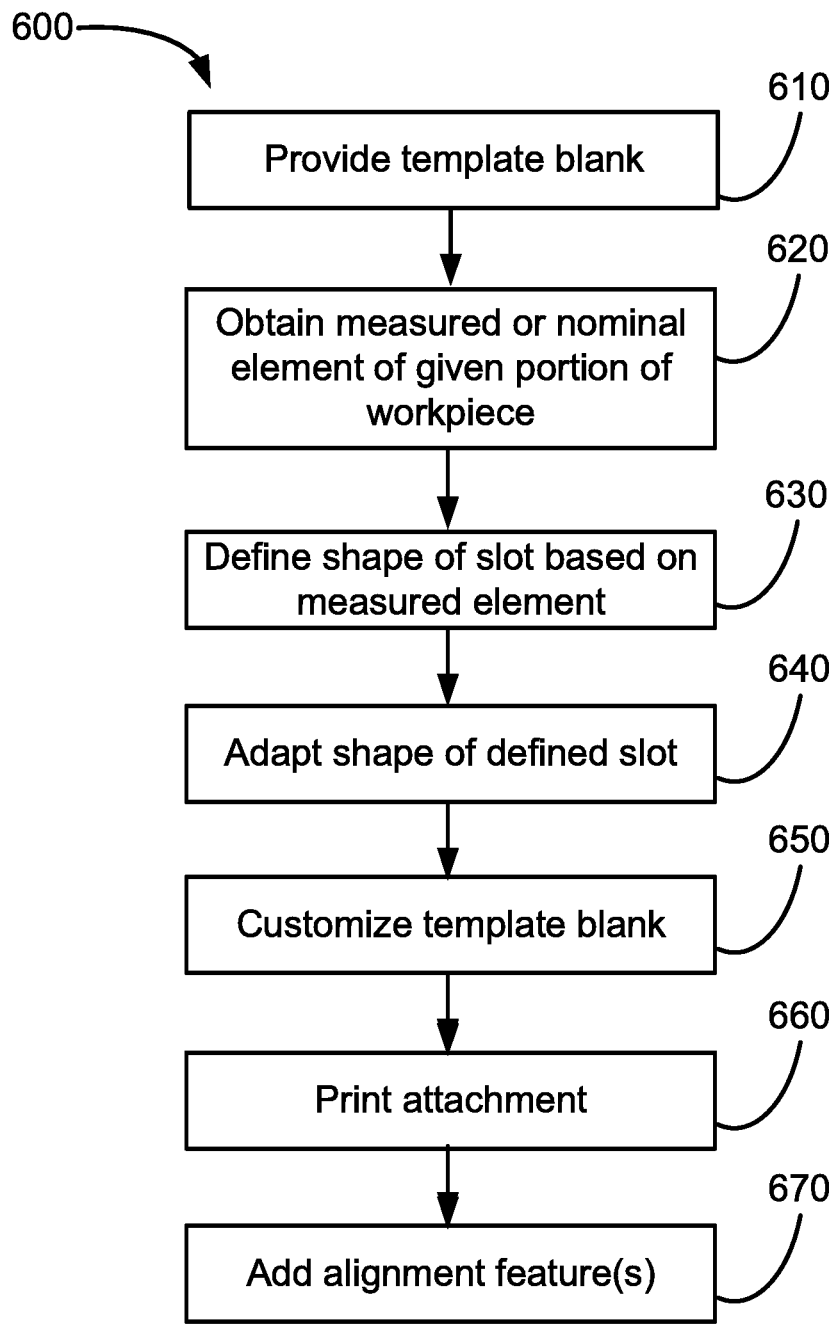
FIG. 6A is a flow chart that illustrates a method of fabricating a workholder.
Figure 6B:
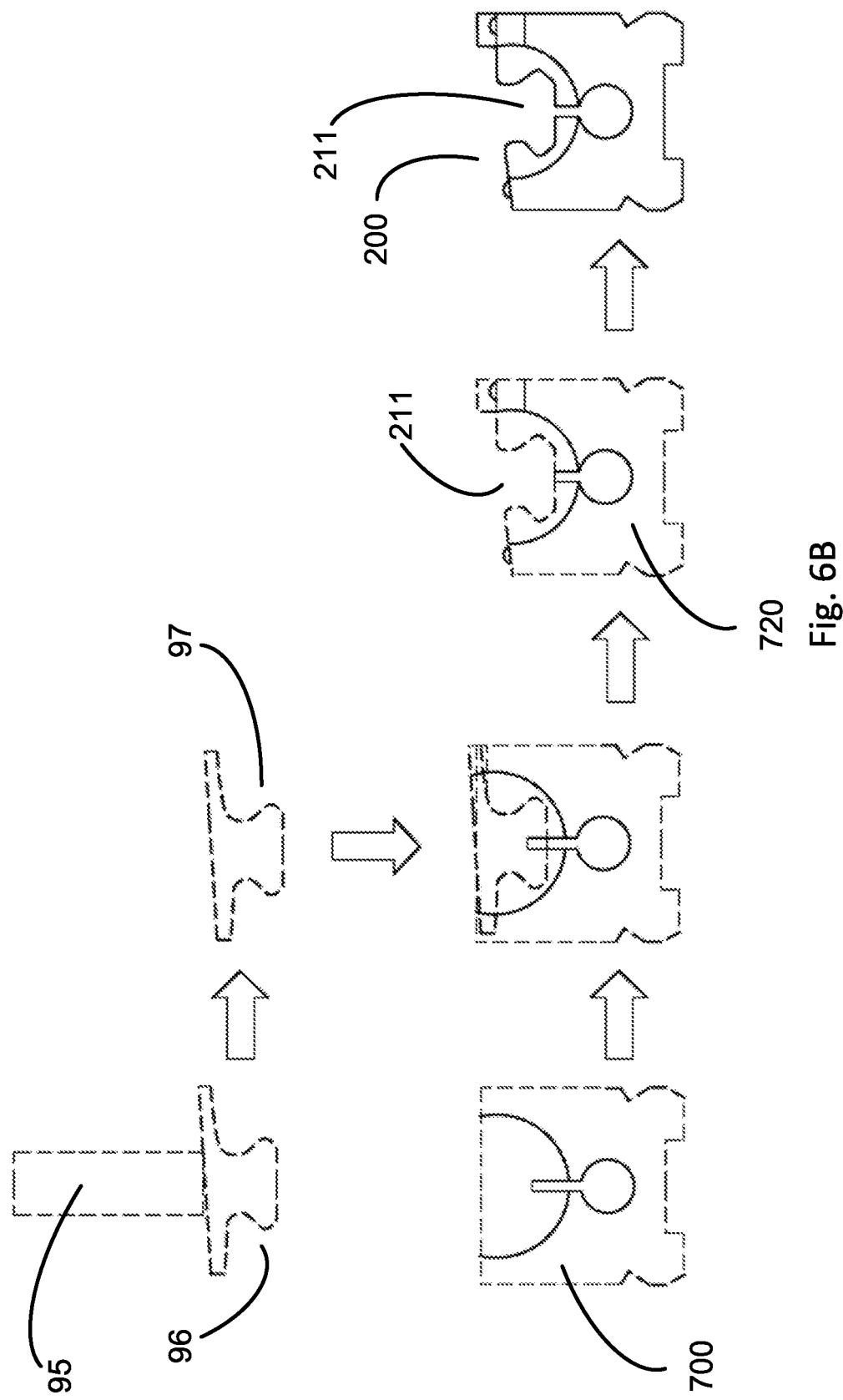
FIG. 6B schematically illustrates templates and components at various stages of the fabrication process.

FIG. 6A schematically illustrates a process 600 for producing a workholder 200 to hold a workpiece 90, and FIG. 6B schematically illustrates templates and components at various stages of the fabrication process. In the following description, the workpiece 90 is referred to as the "component" or as "new component."

The process begins at step 610 by providing a computer-based template blank 700 of a workholder 200. In illustrative embodiments, the computer-based template blank 700 is a CAD model or other digital representation of the modular workholding attachment whereby the slot or cavity, 211, into which the component, 90, is inserted does not exist in the digital model template blank 700. In illustrative embodiments, the digital model template blank 700 specifies solid material in place of (what will eventually be) the insertion slot or cavity, 211, from which any new complex geometry form (i.e., the slot 211) may be cut, printed, fabricated, or otherwise formed using a CAD model of a new component (i.e., the target workpiece for which the workholder is to be adapted to hold), 95, thereby leaving a new slot 211 for the insertion of the new component.

In preferred embodiments, the template blank 700 already includes a standard clamp interface 240, as described above, but other embodiments of the method include fabricating such an interface 240 in addition to fabricating the workpiece interface 210.

At step 620, the process 600 also provides or obtains a nominal or measured representation of the complex geometry of the new component (e.g., the target portion; the root form of the new component, if the component has a root form). In preferred embodiments, a nominal representation is obtained from computer-aided design (CAD) model of the new component, rather than on an actual, physical new component. In illustrative embodiments, this may be described as measuring the complex geometry of the target portion to obtain a measured element.

At step 630, the process 600 defines the shape of the slot 211 based on the measured element. The shape of the slot 211 is, in preferred embodiments, complementary to the shape of the measured element.

To facilitate a tight (snug) fit of the workpiece 90 into the slot 211 of the workholder 200, there preferably is interference of material in the slot or cavity 211. To that end, some embodiments include step 640, which provides either (A) a slight modification of the measured element using its CAD model or other digital form to taper, stretch, shrink or otherwise reduce material from its form so that a slot 211 generated from the measured element is slightly reduced in size as compared to a slot generated by the un-modified measured element, (B) a slight modification to a slot 211 generated to in a shape complementary to the measured element, to produce, between the slot 211 and the given portion of the a component 90 inserted into the slot 211, an interference, as allowable by the material of the workpiece interface 210.

Once the digital form 97 of the slot 211 that is complementary to the target portion, 96, is defined as described above, the slot 211 can be added at step 650 to the digital model template blank 700 of the workholder 200, and consequently used to remove (or never provide, such as in the case of additive manufacturing) that material from the template blank 700 by a Boolean subtraction of the solid or surfaces in digital form, to produce a customized template 720. In some embodiments, this may be described as subtracting, from a digital template blank 700, the measured element, to produce a customized digital template 720 in which the slot 211 has a shape that is complementary to the measured element.

Once the shape for the slot 211 in the customized (and still digital) template 720 has been made for new component, the new template (or digital model) 720 of the workholder for that specific workpiece is complete, and a physical workholder 200 can be produced at step 660, for example via FDM or other 3D printing method. Preferred materials for fabricating a physical attachment are thermoplastic, such as one of ABS, HIPS, and Nylon, or other polycarbonate or copolyester material.

Some embodiments include a step 670, in which one or more alignment features 250 (e.g., magnetic metal button; non-magnetic metal button) are attached-to or embedded-in the bottom surface 241 of the base 240.

A listing of certain reference numbers is presented below.
90: Workpiece (e.g., manufactured component);
90A: An illustrative embodiment of workpiece;
90B: An illustrative embodiment of workpiece;
91: Target portion of workpiece;

95: Illustrative embodiment of workpiece;
96: Illustrative embodiment of target portion of workpiece;
97: Tapered extrusion shape;
100: Coordinate measuring machine;
110: Base;
111: Table;
112: Plane;
113: Measurement envelope;
120: Moveable features;
140: Measuring sensor;
180: Robot;
181: Robot gripper;
182: Robot arm;
190: Storage facility;
191: Drawer or shelf;
192: Storage plate;
193: Surface of storage plate;
194: Metal button (e.g., magnetic or non-magnetic);
195: Button group;
197: Dowel;
198: Dowel group;
199: Alignment structure (e.g., metal button; dowel)
200: Attachment (or "workholder");
200A: Illustrative embodiment of attachment;
200B: Illustrative embodiment of attachment;
201: Top of workholder;
202: External side surface of workholder;
203: External front surface of workholder;
204: External rear surface of workholder;
210: Workpiece interface;
211: Complementary slot (or cavity or aperture);
212: Interface wall (e.g., slot wall);
215: Taper angle;
216: Axis of insertion (direction of insertion);
217: Line illustrating direction of slot wall;
220: Strain relief cavity or aperture;
221: Keyway;
225: Undercut (or countersink);
231: Locating point;
232: Reference feature;
240: Base (clamp interface);
241: Bottom of base;
250: Securing structure (e.g. magnet; non-magnetic metal; dowel cavity);
320: Attachment reference surfaces and/or reference features;
400: Clamping device (e.g., clamp system);
420: Jaw reference features;
700: Template blank;
720: Customized template.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A single-piece workholding apparatus for holding a workpiece during inspection by a coordinate measuring machine, the workpiece having a target portion having a complex geometry, the apparatus comprising:
a first interface having a fixed shape, the first interface adapted to couple to the target portion of the workpiece; and
a second interface adapted to securely couple to a clamping system.

P2: The workholding apparatus according to P1, wherein the first interface is flexible so as to accept the target portion of the workpiece and hold the target portion via compression fitting.

P3: The workholding apparatus according to any of P1-P2, wherein the first interface has a shape that is complementary to a shape of the target portion.

P4: The workholding apparatus according to any of P1-P3, wherein the first interface is shaped to provide a small amount interference so that the first interface applies preload against the workpiece to constrain and preferably prevent movement of the workpiece during inspection.

P5: The workholding apparatus according to any of P1-P4 wherein the workholding apparatus comprises thermoplastic.

P6: The workholding apparatus according to any of P1-P5, further comprising a set of magnets disposed to magetically secure the workholding apparatus to a surface.

P10. A workholding system for holding each of a plurality of workpieces during inspection by a coordinate measuring machine, each workpiece having a target portion having a complex geometry, the system comprising:
a first holding apparatus having:
a first holding interface adapted to couple to a given portion of a first workpiece, the given portion of a first workpiece having a first complex geometry; and
a first securing interface;
a second holding apparatus having:
a second holding interface adapted to couple to a given portion of a second workpiece, the given portion of a second workpiece having a complex geometry that is different from the first complex geometry; and
a second securing interface; and
a securing system secured to the coordinate measuring machine, and configured to serially receive and secure, without changing the setup of the securing system, the first securing interface and the second securing interface.

P20: A method of providing a single-piece workholding apparatus for holding a workpiece during inspection by a coordinate measuring machine, the workpiece having a target portion having a complex geometry, the method comprising:
measuring the complex geometry of the target portion to obtain a measured element; and
creating, from a template, single-piece workholding apparatus comprising an interface having a fixed shape, the interface adapted to couple to the target portion of the workpiece.

P21: The method of P20, wherein creating the single-piece workholding apparatus comprises creating, from the template, a standard clamping interface configured to interface to a clamping system.

P22: The method of P20, wherein creating the single-piece workholding apparatus comprises:
subtracting, from a digital template, the measured element, to produce a customized digital template in which the interface has a shape that is complementary to the measured element; and
3D printing the customized digital template.

P23: The method of P22, wherein 3D printing the customized digital template comprises producing the single-piece workholding apparatus from thermoplastic.

P24: The method of P22, wherein the thermoplastic is one of ABS, HIPS, and Nylon.

P25: The method of P22, wherein 3D printing the customized digital template comprises producing the single-piece workholding apparatus via fused deposition modeling (FDM).

P40: A workholding method whereby a modular single piece attachment of flexible material is affixed to a component by a compression fitting and is interchangeable with a common clamping device having reference features that match the single piece attachment.

P41: Method of P40, whereby the flexible material of the single piece attachment is of thermoplastic.

P42: Method of P40, whereby the single piece attachment has a slot or cavity into which a component may be inserted.

P43. Method of P42, whereby the slot or cavity has a tapered angle of between 0 and −5 degrees in the direction of insertion to ensure gradually increasing compression as a component is inserted.

P44: Method of P40, whereby the single piece attachment has a relief hole, 120, in the form of a cylindrical or other curved profile to relief stresses while a component is compression fit within the single piece attachment.

P45: Method of P40, whereby the single piece attachment has an undercut or countersink area to allow access to the component's complex geometry while affixed to the single piece attachment.

P46: Method of P40, whereby the reference features of the flexible attachment are small raised bumps in spherical, cylindrical, cubic or other protruding surface forms used to make contact with the component, at precise places on its complex geometry.

P47: Method of P40, whereby the single piece attachment has reference features, for repeatable positioning and clamping of the single piece attachment and affixed component within a clamping device.

P48: Method of P47, whereby the clamping device is a vise, chuck or other standard mechanism with two or more moving parts used for workholding purposes.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A fixture for holding a workpiece during inspection by a coordinate measuring machine, the workpiece having a target portion having a target portion shape, the fixture comprising:
    a workpiece interface having a fixed shape, the workpiece interface adapted to couple to the target portion of the workpiece wherein the workpiece interface has a contour that is the complement of the target portion shape of the target portion such that the contour is complementary to the shape of the target portion, and wherein the workpiece interface is flexible so as to accept the target portion of the workpiece and so as to provide a compressive force on the target portion of the workpiece when the workpiece is disposed in the workpiece interface so as to hold the target portion via compression fitting; and
    a base having a second interface configured to securely couple to a clamping system.

2. The fixture of claim 1 wherein the base has a bottom face, the fixture further comprising a plurality of cavities in the bottom face, the plurality of cavities arranged in a pattern to match a corresponding pattern of dowels on a storage plate.

3. The fixture of claim 1, further comprising a plurality of base magnets coupled to the base, the plurality of base magnets arranged in a base pattern to match a corresponding pattern of storage magnets arranged on a storage plate.

4. The fixture of claim 1, further comprising:
    a first set of base features, which first set of base features is configured to interlock with counterpart features on a robotic gripper; and a second set of base features, which second set of base features is configured to interlock with counterpart jaw reference features of a clamp,
wherein the first set of base features is not identical to the second set of base features.

5. The fixture of claim 1, further comprising base features, which base features are configured to interlock with counterpart features on a robotic gripper, and the same base features are configured to interlock with counterpart jaw reference features of a clamp.

6. The fixture of claim 1 wherein the target portion shape has a complex geometry defined by a plurality of curved surfaces, and the workpiece interface is shaped and sized to have a contour that is the complement of said complex geometry, to provide a compressive force on the target portion of the workpiece when the workpiece is disposed in the workpiece interface.

7. The fixture of claim 1 wherein the workpiece interface comprises thermoplastic.

8. The fixture of claim 1, wherein the workpiece interface is pliable so that it can flex when accepting the workpiece.

9. A workholder for holding a workpiece during inspection by a coordinate measuring machine, the workpiece having a target portion having a target portion shape, the workholder comprising:
base means for securely coupling to a clamping system; and
means for receiving and securing the target portion of the workpiece, said means having a workpiece interface having a fixed shape comprising a contour that is the complement of the target portion shape of the target portion such that the contour is complementary to the shape of the target portion, wherein the workpiece interface is flexible so as to accept the target portion of the workpiece and so as to provide a compressive force on the target portion of the workpiece when the workpiece is disposed in the workpiece interface so as to hold the target portion via compression fitting.

10. The workholder of claim 9 wherein the base means has a bottom face, the base means further comprising a plurality of cavities in the bottom face, the plurality of cavities arranged in a pattern to match a corresponding pattern of dowels on a storage plate.

11. The workholder of claim 9, further comprising a plurality of base magnets coupled to the base means, the plurality of base magnets arranged in a base pattern to match a corresponding pattern of storage magnets arranged on a storage plate.

12. The workholder of claim 9, wherein the workpiece interface is pliable so that it can flex when accepting the workpiece.

13. The workholder of claim 9, wherein the target portion shape has a complex geometry defined by a plurality of curved surfaces, and the workpiece interface is shaped and sized to have a contour that is the complement of said plurality of curved surfaces of said complex geometry to provide a compressive force on the target portion of the workpiece when the workpiece is disposed in the workpiece interface.

* * * * *